United States Patent [19]

Venner et al.

[11] 4,083,475
[45] Apr. 11, 1978

[54] APPARATUS FOR FEEDING AND PROPORTIONING PULVERULENT MATERIALS

[75] Inventors: Etienne Venner, Bonsecours; Daniel Lenormand, Romilly-sur-Andelle, both of France

[73] Assignee: Dosapro Milton Roy, Pont-Saint-Pierre, France

[21] Appl. No.: 700,307

[22] Filed: Jun. 28, 1976

[30] Foreign Application Priority Data

Sep. 19, 1975 France .............................. 75 28815

[51] Int. Cl.² .................... B65G 3/12; B65G 33/08; B65G 65/70
[52] U.S. Cl. .................................. 222/198; 222/238
[58] Field of Search ................ 222/238, 240–242, 222/202, 203, 198

[56] References Cited

U.S. PATENT DOCUMENTS

| 1,452,585 | 4/1923 | Adams | 222/241 X |
| 2,650,002 | 8/1953 | Farley | 222/238 |
| 3,186,602 | 6/1965 | Ricciardi | 222/241 X |
| 3,248,019 | 4/1966 | Kohler | 222/241 X |

FOREIGN PATENT DOCUMENTS 1,113,651  5/1968  United Kingdom ................ 222/202

*Primary Examiner*—Robert B. Reeves
*Assistant Examiner*—Francis J. Bartuska

[57] ABSTRACT

Apparatus for feeding pulverulent materials comprising a hopper with an upper vibrating portion mounted on a lower portion in which a screw equipped with a recycling arm and an associated stirring device feeds the pulverulent material at a desired rate through a discharge conduit mounted at the base of the hopper.

8 Claims, 3 Drawing Figures

APPARATUS FOR FEEDING AND PROPORTIONING PULVERULENT MATERIALS

The present invention relates to an apparatus for feeding and proportioning pulverulent materials, of the type comprising a hopper into which is supplied a material to be distributed and dispensed and at the base of which is provided a device for feeding and proportioning the materials by means of a screw which rotates and drives the material through to a discharge conduit.

The known apparatuses of the said type operate satisfactorily, especially where the pulverulent material is strictly stable in regard to humidity, temperature or exposure to air. Unfortunately, the product to be dispensed does not, in most cases, offer such stability features, so that the proportioning may vary depending on the conditions of use and particularly the humidity and temperature of the ambient air, the duration of storage of the pulverulent material, etc. In addition, there are cases where, despite the numerous precautions taken and improvements made in the apparatus to ensure a good feeding of the discharge screw, vault and/or chimney effects take place in the hopper of the apparatus, which effects are detrimental to accurate proportioning and, sometimes, lead to its interruption.

The invention has for its purpose to avoid the aforementioned drawbacks by always ensuring satisfactory proportioning conditions, even under most unfavorable conditions of use.

According to an essential feature of the invention, the apparatus is provided, in addition to the said discharged screw, with a stirring device arranged above the said screw and comprising stirring paddles which, during their stirring action, so act upon the pulverulent material that, in that portion of the apparatus, the said material is returned from the walls of the apparatus to the central region. Owing to this arrangement, any chimney effect which would otherwise occur is immediately prevented and a good feeding of at least the central region of the discharge screw is permanently obtained, whereby a good uniformity of the proportioning is already ensured.

According to another feature of the apparatus of the invention, associated with the said discharge screw is a recycling arm which, in rotating therewith, stirs the material around the screw over the greater part of the screw length contained within the base of the hopper. This recycling arm combined with the stirring device described above therefore ensures continuous and uniform feeding of the whole length of the discharge screw, resulting in uniform dispensing of the material.

According to another feature of the invention, the hopper is unsymmetrical and comprises a substantially vertical wall-portion and an inclined, upwardly widening portion. Thus, there is no surface likely to support the pulverulent material on one side of the hopper where the wall is vertical, whereby no vault effect is likely to appear since any such vault tending to be formed will collapse immediately when contacting the vertical wall, thus leading to the collapse of the rest of the vault.

According to another original feature of the present invention, at least the upper portion of the hopper is so mounted as to be resiliently suspended at at least several point distributed on a surface. When an oscillation or vibration generating device is associated to this hopper portion in a manner known per se, a vibration and oscillation of at least the upper portion of the hopper is thus obtained, but not, as in the prior art, about a stationary axis of rotation or oscillation which necessarily results in a certain packing of the pulverulent material along certain field lines, but on the contrary about instantaneous vibration or oscillation centers which are variable at any moment and therefore produce an unpacking of the pulverulent material, which is highly favorable to a good flowing of the product in the apparatus.

The invention will appear more clearly from the following description made with reference to the appended drawings showing by way of illustration one form of embodiment of the invention. In the said drawings.

Figure 1:
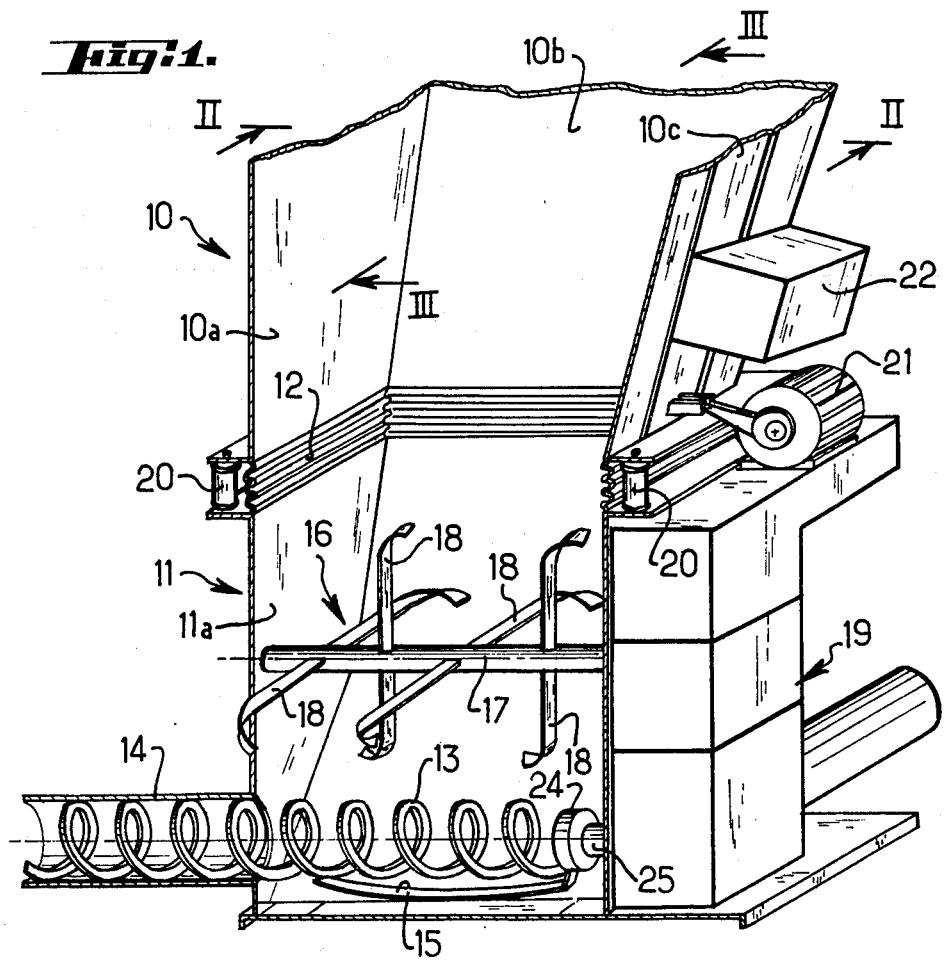
FIG. 1 is a diagrammatic perspective view, partially broken away, of a feeding and proportioning apparatus designed according to the invention.

According to the form of embodiment illustrated, the hopper of the apparatus comprises an upper portion 10 and a lower portion 11 interconnected by an intermediate portion 12. In the lower portion 11 is mounted a device for feeding and dispensing a material by means of a screw 13 which rotates and drives the pulverulent material to be dispensed within a discharge conduit or dispensing pipe 14. With the screw 13 is associated a recycling arm 15 which rotates together with the screw 13. Above the screw 13 is provided a stirring device 16 composed essentially of a shaft 17 rotating above the screw 13 and arranged in parallel relationship therewith, the said shaft carrying stirring paddles 18 in the general form of substantially flat plates or strips with curved ends.

A motor-reducer set 19 drives the discharge screw 13 and the stirring device 16 in rotation at suitable relative speeds.

The hopper intermediate portion 12 interconnecting the lower portion 11 and the upper portion 10 is so constituted as to allow relative vibration and/or oscillation of the upper portion 10 with respect to the lower portion 11. To this end, the hopper upper portion 10 is resiliently suspended on the lower portion 11 by means of resilient pads, for instance of rubber, such as the ones shown at 20.

At the hopper upper portion 10 is provided, in a manner known per se, an oscillation generating device and, for example of the crank-and-rod type such as the one illustrated 21, or for example of the unbalance type such as the one diagrammatized at 22.

Figure 2:
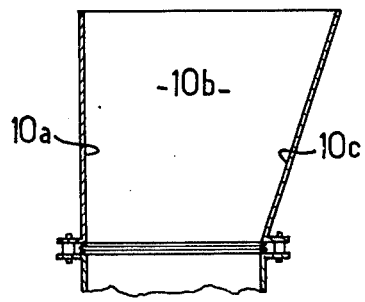
FIGS. 2 and 3 are diagrammatic sectional views, to a smaller scale, along the planes II and III, respectively, of FIG. 1, showing two vertical sections, at right angles to each other, of the upper portion of the hopper.
Figure 3:
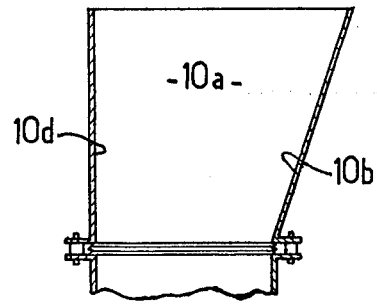

As appears more clearly from FIGS. 2 and 3, the hopper, which is substantially rectangular in horizontal section, has two vertical mutually adjacent walls 10a and 10d and two inclined, upwardly widening mutually adjacent walls 10b and 10c.

The operation and advantages of the apparatus just described will now be explained.

When the discharge screw 13 is rotated through the medium of the motor-reducer set 19 it becomes loaded with materials and ensures the dispensing of the product through the dispensing pipe 14. The discharge screw 13 may be of any suitable known type, for example of the helical Archimedean type with either a constant or a variable pitch. It may be either hollow, as in the example considered, or solid. It may also be semi-hollow, i.e. strenghtened by a central rod to which the various turns are connected by small, radially welded pieces of wire.

The recycling arm 15 secured to the screw 13 rotates therewith and stirs the material around the screw over the greater part of its length contained within the base of the hopper, thus ensuring good uniformity and homogeneity of the feeding of the screw over its whole feeding length.

As diagrammatically illustrated, the screw 13 and the recycling arm 15 are secured to a support 24 mounted at the end of the shaft 25 driving the screw. Under such conditions, several forms and sizes of dispensing screw 13 and recycling arm 15 may be used depending upon the product to be dispensed by means of an apparatus of a given type. Likewise, the conduit 14 is interchangeable by being advantageously secured to the wall 11a of the lower portion 11 of the hopper, which wall can be fastened for example by means of screws (not shown) on the rest of the hopper lower portion.

In addition to the proportioning and discharging function fulfilled by the screw 13 and the recycling arm 15, a stirring of the pulverulent material above the screw 13 is ensured by the stirring device 16. The stirring is so performed that the pulverulent material in this portion of the apparatus is permanently returned from the walls of the apparatus towards the central region in two longitudinal circulating flows. This prevents the occurrence of the above-mentioned chimney effect which takes place in the apparatuses of the prior art. In addition, the stirring device by itself already ensures a good constant feeding of the central portion of the discharge screw 13, the uniformity of the feeding being additionally ensured by the action of the recycling arm 15.

In the example contemplated, the stirring device comprises several paddles 18 in the form of substantially flat plates or strips with curved ends, whereas the recycling arm 15 is in the form of a slightly curved plate or strip extending substantially along the centre-line of the screw 13.

The hopper upper portion 10, which is oscillated or vibrated by any known agitating means such as the ones diagrammatized at 21 or 22, is, according to the invention, resiliently suspended at several points, for example by means of resilient rubber pads, of springs or any other appropriate means. By thus being resiliently suspended at several points distributed on a surface, the hopper portion 10 has no stationary axis of oscillation or vibration, and this is highly favourable in that it ensures permanent unpacking of the material in contradistinction to what occurs in a hopper which oscillates or vibrates about a substantially stationary axis.

In addition, the unsymmetrical shape of the upper portion of the hopper prevents the pulverulent material from forming a vault by removing the hollowing or sinking effect producing the latter. Indeed, the pulverulent product cannot adhere to the vertical walls such as 10a, 10d owing to the lack of support thereon, thus resulting in a continuous downward motion of the product in that region. Under such conditions, no vault can be produced, since it will not be supported at one side and therefore cannot but collapse. Indeed, it is known from experience that even where the materials are highly liable to vaulting no vault is formed in such a hopper.

Of course, the form of embodiment just described is open to a great number of modifications. In particular, the hopper is not necessarily rectangular in horizontal section, but may as well be circular, oval or of any other shape. In this case, at least a portion of the wall will be substantially vertical and another portion will be inclined and upwardly widening, the continuous flow of the product along the vertical wall preventing the occurrence of the vault effect.

Likewise, the structure of the paddle-type mixing device may differ from the one described. What matters is that it should generally favour the feeding of the discharge screw located below by causing the material which is in contact with the walls in the region of the mixing device to be directed towards the centre of the hopper so as to ensure the feeding of the discharge screw.

The invention therefore comprises all technical equivalents to the means described as well as their combinations should the latter be carried out according to its gist and used within the scope of the following claims.

What is claimed is:

1. Apparatus for feeding and proportioning pulverulent materials comprising in combination: a hopper including an upper section, and a lower section, said upper section being resiliently connected to said lower section by an intermediate section so as to permit movement of said upper section relative to said lower section in random fashion; a rotatable discharge screw mounted horizontally in said lower section and extending through a wall thereof for discharging the material from the hopper; a stirring device rotatably mounted in said hopper above and extending substantially parallel to said discharge screw having a plurality of stirring paddles thereon, said stirring paddles comprising substantially flat strips the ends of which are curved away from the plane of the said strips in opposed directions and being mounted on a rotatable shaft which extends in parallel spaced relation above said discharge screw, said paddles being positioned to convey material stored in said hopper from the regions therein adjacent the walls thereof towards the central region of the hopper; and means for imparting random vibratory or oscillatory movement to the upper section of said hopper relative to said lower section.

2. Apparatus according to claim 1, comprising a recycling arm associated with said discharge screw and rotatable in the same direction and at the same speed therewith, said arm extending along the major portion of the length of said screw and thus being adapted to stir the material about the screw over the greater portion of the screw length to insure uniformity and homogeneity of feed to the screw over substantially its entire length.

3. Apparatus according to claim 1, wherein the upper section of said hopper is unsymmetrical including at least one substantially vertical wall portion and the remaining wall portions being inclined upwardly and outwardly.

4. Apparatus according to claim 3, characterized in that the hopper is substantially rectangular in horizontal section, two mutually adjacent walls of said upper section are vertical and the two others are inclined.

5. Apparatus according to claim 1, wherein resilient pads are mounted between said lower section and said upper section.

6. Apparatus according to claim 1, wherein said stirring device is mounted in opposed walls of the lower section of the hopper.

7. Apparatus according to claim 1, wherein said intermediate section is a corrugated resilient wall and said upper section is mounted thereon.

8. Apparatus according to claim 2, wherein said recycling arm is secured at one end thereof to said discharge screw.

* * * * *